United States Patent [19]

Legatti

[11] 3,838,340
[45] Sept. 24, 1974

[54] DIRECT READING WATTMETER FOR MEASURING THE TRUE WATTS POWER CONSUMPTION OF AN A.C. CIRCUIT

[76] Inventor: Raymond H. Legatti, 1567 Alexander Rd., Clearwater, Fla. 33516

[22] Filed: June 11, 1973

[21] Appl. No.: 369,060

[52] U.S. Cl. .............................. 324/142, 324/107
[51] Int. Cl. ...................... G01r 21/00, G01r 29/16
[58] Field of Search ........................... 324/142, 107

[56] References Cited
UNITED STATES PATENTS
2,998,569  8/1961  Legatti et al. .................. 324/142 X
3,710,254  1/1973  Kusui ............................... 324/142

Primary Examiner—Alfred E. Smith
Attorney, Agent, or Firm—McGlew and Tuttle

[57] ABSTRACT

The wattmeter includes a potential transformer having a primary winding connected across a phase of an a.c. circuit and having a first center-tapped secondary winding and a second secondary winding. The first secondary winding is included in a full wave rectifying bridge further including a pair of series-connected bridge resistors connected across the terminals of the first secondary winding, diodes, and a terminal resistor of a current transformer in the associated phase. The terminal resistor is connected between the center tap of the first secondary winding and the junction point of the bridge resistors, and constitutes the diagonal of the bridge circuit. A differential amplifier has an input connected across the series-connected bridge resistors, and an indicating meter is connected across the output of the differential amplifier. A second secondary winding of the potential transformer is connected, through a diode or diodes, to the differential amplifier to provide a d.c. operating voltage across the amplifier. When used in a polyphase a.c. circuit, respective full wave rectifying bridge circuits are provided for each phase, and all of the pairs of series-connected bridge resistors are connected in series with each other. In this case, the input of the differential amplifier is connected across all of the series-connected bridge resistors. The differential amplifier includes a pair of transistors and associated circuitry, with the input circuit being connected to the bases of the two transistors and the indicating meter being connected between the two outputs of the transistors.

10 Claims, 4 Drawing Figures

DIRECT READING WATTMETER FOR MEASURING THE TRUE WATTS POWER CONSUMPTION OF AN A.C. CIRCUIT

FIELD AND BACKGROUND OF THE INVENTION

This invention relates to the sensing of power in a.c. systems and, more particularly, to a novel and improved direct reading wattmeter, for measuring the true watts power consumption of an a.c. circuit, in either a positive or negative sense and which works with a square relation between the current, voltage and watts, or a relation which represents the voltage multiplied by the current to obtain a direct reading of the true watts power.

Measurement of a.c. power or kw has involved a rather complicated and extensive array of instruments. Such measurement generally is effected by utilizing individual instrumentation in each phase of the circuit and, even with such arrangements, it is difficult to obtain a correct measurement of the totalized true power or kilowatts as distinguished from kilovolt amperes, of a polyphase system.

U.S. Pat. No. 2,998,569, issued Aug. 29, 1961, illustrates a measuring arrangement involving a wattmeter transducer constituting a three-phase totalizing device for the watts of power and which converts the totalized true power of the three phases into a proportional direct current signal which is utilized to energize a measuring instrument such as, for example, an ammeter, a milliammeter, or the like. In the arrangement shown in U.S. Pat. No. 2,998,569, there is utilized the usual potential and current transformers associated with each phase of a polyphase, such as a three-phase a.c. system. The secondary winding of each potential transformer is center-tapped, and the two halves thereof are connected in a bridge arrangement including a pair of diodes and a pair of resistors forming, with the two halves of the secondary winding, the legs of the bridge circuit. The terminal resistor of each current transformer secondary winding is in series in the diagonal of the associated bridge circuit. With this arrangement, in the no load condition, equal direct current voltages appear across the two resistors of each bridge circuit, and no current flows through the current transformer terminating resistor. However, upon application of load to the external circuit, current flows through the current transformer terminating resistor and produces a direct current signal output from each bridge.

The signal appearing across the output terminals of the bridge will represent the true power if the current is in phase with the voltage in the external circuit or will represent EI cos $\phi$, or true watts, if the current of the external circuit is phase displaced with respect to the voltage, but these conditions hold true only if the external voltage remains constant. A special compensating arrangement is necessary in U.S. Pat. No. 2,998,569 to compensate for changes in the external voltage.

SUMMARY OF THE INVENTION

In accordance with the invention, a direct reading wattmeter, which measures the true watts power consumption of an a.c. circuit, is provided by applying the output of the bridge circuit of the wattmeter of U.S. Pat. No. 2,998,569 to the input of a differential amplifier, and by connecting a current indicating meter across the output of the differential amplifier. Additionally, each potential transformer includes, in addition to the center-tapped secondary winding, a second secondary winding, and the voltage across this second secondary winding is rectified and applied to the differential amplifier as an operating voltage therefor.

The arrangement of the present invention has the advantage that there is obtained a multiplication factor for the indicating meter, namely a squaring factor in a direct relation. If the voltage applied to the a.c. external circuit drops, the current applied will also drop proportionally and the net result in watts is a square relation. For example, if the voltage decreases to one half, the current will decrease to one half and the watts will decrease to one quarter, which represents a square relation. A further advantage is that amplification is obtained due to the use of the differential amplifier interposed between the transducer circuit and the current indicating instrument.

It is conceivable that differential amplifiers have been used for obtaining amplification of a signal. However, the distinction of the present arrangement is that the differential amplifier is used to make a wattmeter work with a square relation between the current, voltage and watts, or a relation which represents the voltage multiplied by the current to obtain a direct reading wattmeter. Such an arrangement has never been suggested for wattmeters, particularly with respect to a differential amplifier where there is also obtained an amplification of the signal.

A considerable advantage of the present invention is that the power input to the current and voltage transformers is extremely small, resulting in a substantial reduction in the heat to be dissipated. This is possible because of the use of the differential amplifier which has a relatively high amplification factor, so that there is obtained a direct reading wattmeter with only an extremely small power input. If the arrangement did not have the characteristic of making the voltage proportional, it would not operate properly.

It is possible, of course, to use a differential amplifier in the output of a wattmeter. However, in the present invention, the differential amplifier is connected directly into the wattmeter circuit in such a way that the voltage to the differential amplifier is proportional to the voltage to be measured and, if this voltage drops, the current output from the differential amplifier drops proportionally. This provides a direct reading wattmeter.

The important and basic underlying concept of the invention arrangement is that the combination of the differential amplifier with the wattmeter circuitry shown in U.S. Pat. No. 2,998,569, provides a direct reading wattmeter with an amplified reading which, in turn, reduces the required input power in the current and voltage transformers. This basically new approach to a multiplication system where you are multiplying current by voltage has the advantages of economy, reduction in the necessary current and voltage inputs, and a great reduction in heating.

An object of the invention is to provide an improved power sensing apparatus for measuring, in both a positive sense and a negative sense, the true watts power consumption of an a.c. circuit.

Another object of the invention is to provide a direct reading wattmeter for measuring the true watts power consumption of an a.c. circuit.

A further object of the invention is to provide such a wattmeter in which a differential amplifier is incorporated between current and voltage sensing means and a current measuring instrument to provide an amplification factor.

Another object of the invention is to provide such a wattmeter, incorporating a differential amplifier, which is incorporated into the wattmeter circuit in such a manner that the voltage to the differential amplifier is proportional to the voltage to be measured.

A further object of the invention is to provide such a direct reading wattmeter which, due to the provision of an amplified reading, in turn reduces the required input power in current and voltage transformers providing the current and voltage indications.

For an understanding of the principles of the invention reference is made to the following description of typical embodiments thereof as illustrated in the accompanying drawings.

DESCRIPTION OF THE PREFERRED EMBODIMENTS

Figure 1:
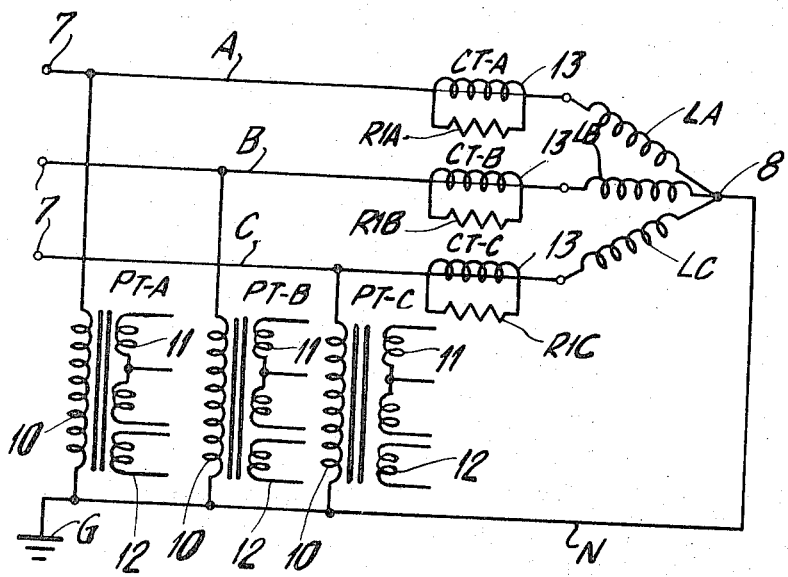
FIG. 1 is a schematic wiring diagram of a Y-connected, grounded neutral three-phase a.c. circuit having potential transformers and current transformers associated with each phase.

Referring to the drawings, FIG. 1 illustrates a typical Y-connected grounded neutral three-phase circuit having conductors A, B and C each extending between a three-phase input terminal 7 and one end of a load, such as inductors LA, LB and LC. The other terminals of the three loads are commonly connected, at a junction point 8, to a neutral conductor N connected to ground G. In accordance with the invention, each line conductor A, B and C has coupled thereto a respective current transformer CT-A, CT-B and CT-C. Also, respective potential transformers PT-A, PT-B and PT-C are connected between each line conductor A, B and C and the neutral conductor N. Each potential transformer PT has a primary winding 10, a first center tapped secondary winding 11 and a second secondary winding 12. Each current transformer CT has a secondary winding 13, and the current transformer may constitute a split iron core having the winding 13 wound thereon and the respective line conductor A, B or C extending therethrough, as is common in the art. The respective secondary windings 11, 12 and 13 are included in the circuitry of the direct reading wattmeter of the present invention, as will be explained more fully hereinafter. Also, as is usual in the prior art, the secondary winding 13 of each current transformer is connected to a respective terminal resistor R1A, R1B and R1C.

Figure 2:
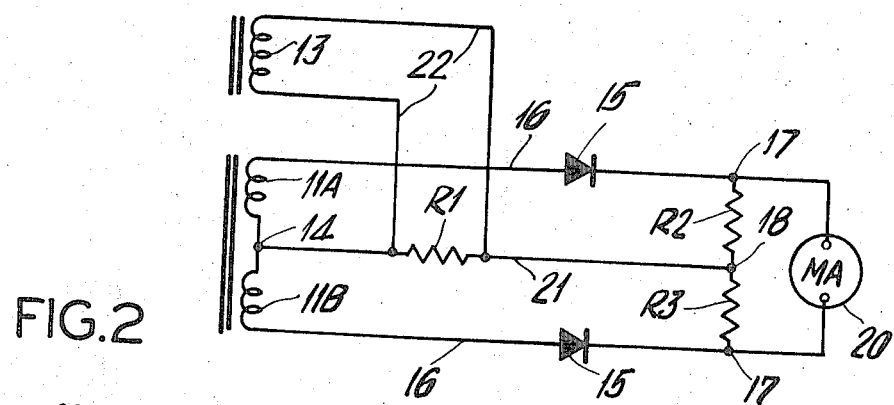
FIG. 2 is a schematic wiring diagram of the basic bridge circuit for the wattmeter of U.S. Pat. No. 2,998,569.

For a better understanding of the present invention, reference will now be made to the basic single phase circuit of the polyphase power totalizing and indicating apparatus of U.S. Pat. No. 2,998,569, as illustrated in FIG. 2. Referring to FIG. 2, the winding sections 11A and 11B of the center tapped secondary winding 11 of each potential transformer are interconnected at a junction point 14. Respective conductors 16 connect the outer terminals of winding sections 11A and 11B to respective junction points 17 with a respective diode 15 being connected in each conductor 16. A pair of resistors R2 and R3 is connected between terminals 17, the resistors R2 and R3 being series connected at junction point 18, and being hereinafter referred to as seriesconnected bridge resistors. A conductor 21 connects junction point 14 to junction point 18, and a terminal resistor R1 of the secondary winding 13 of the current transformer CT of the same phase as the potential transformer PT having the secondary winding sections 11A and 11B is connected in series in conductor 21. In FIG. 2, current transformer secondary winding 13 is illustrated as having its terminals connected to the terminals of resistor R1 by conductors 22. Through conductors 22, the secondary winding voltage of a current transformer is applied across terminal resistor R1.

Refering again to FIG. 2, it will be noted that secondary winding sections 11A and 11B, diodes 15, and series-connected resistors R2 and R3 form a bridge circuit having the conductor 21, with the current transformer terminal resistor R1 connected in series therein, as a bridge diagonal extending between center tap 14 and junction point 18. The junction points 17, at the outer ends or terminals of resistors R2 and R3, form the output terminals at which the effective secondary winding voltages of the potential transformer secondary windings 11A and 11B and the current transformer secondary winding 13 are available. An indicating meter, such as a milliammeter 20, is connected across output terminals 17.

With the described arrangement, and in the no load condition, d.c. voltages appearing across resistors R2 and R3 are equal, and there is no current flow between the output terminals 17. However, if the external system shown in FIG. 1 has a load applied thereto, there is a current flowing through each current transformer, and thus this current, in the single phase circuit illustrated in FIG. 2, appears as a signal voltage across its associated terminal resistor R1. If the external load is purely resistive, the signal voltage will be in phase with the reference voltage and it will add to and subtract from the respective opposite halves of the bridge circuit shown in FIG. 2. This will produce a d.c. component in the meter circuit that is proportional to the external a.c. current. On the other hand, if the external load is at least partly reactive, the signal voltage appearing across terminal resistor R1 is phase-displaced from the reference voltage, and the effective voltage drop developed across terminal resistor R1 is equal to $EI \cos \phi$, or the true watt or kilowatt power consumed by the load connected in the phase illustrated in FIG. 2. However, and as mentioned in U.S. Pat. No. 2,998,569 as well as hereinabove, the abovementioned result holds true only if the external voltage, that is the voltage across a phase of the circuit shown in FIG. 1, for example, remains substantially constant and, for this purpose, in the arrangement shown in U.S. Pat. No. 2,998,569, a compensating means is provided.

In the direct reading wattmeter of the present invention, such a compensating means is no longer required and the wattmeter of the present invention will measure the true watts irrespective of voltage variations in the external circuit, by virtue of the provision of a differential amplifier connected between the output terminals of the bridge circuit and the indicating meter 20. This differential amplifier has applied thereto a d.c. operating voltage which varies in accordance with the voltage in the external circuit. The differential amplifier is illustrated in FIG. 3.

Figure 3:
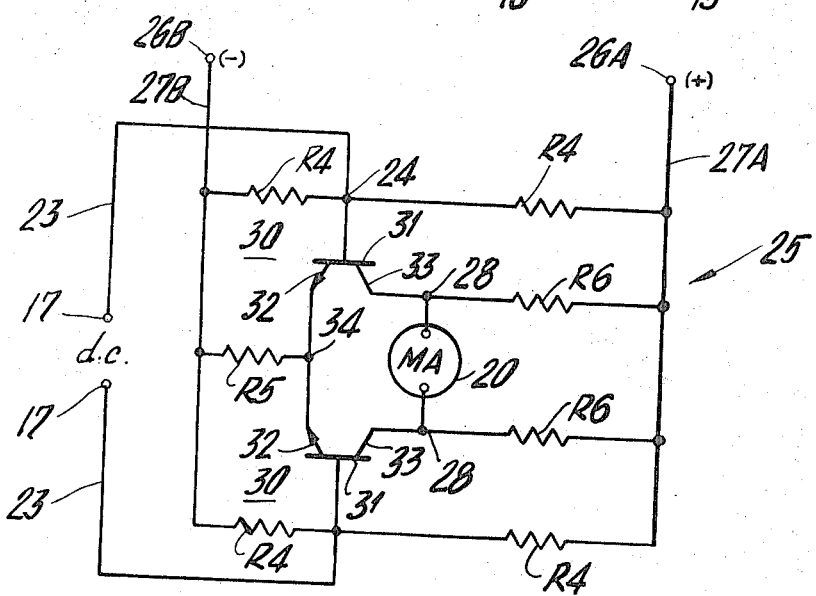
FIG. 3 is a schematic wiring diagram of the differential amplifier forming part of the wattmeter of the present invention.

Referring to FIG. 3, differential amplifier 25 includes a pair of NPN transistors 30 having bases 31, emitters 32 and collectors 33. The output terminals 17 of a bridge circuit, such as shown in FIG. 2, are connected by respective conductors 23 to respective junction points 24 each connected to the base 31 of a respective transistor 30. A d.c. voltage, proportional to the a.c. voltage in the external circuit, is applied to the terminals 26A and 26B having the indicated polarity, and these terminals are connected to respective conductors 27A and 27B. Resistors R4 connect each conductor 27A and 27B to each junction point 24. The d.c. voltage applied to terminals 26A and 26B is the operating voltage for amplifier 25, and this operating voltage varies in accordance with variations in the a.c. voltage of the external circuit.

Emitters 32 of the two transistors 30 are interconnected at a junction point 34, which is connected by a resistor R5 to conductor 26B. Each collector 33 is connected, through a respective junction point 28 and a respective resistor R6, to conductor 27A. Milliammeter 20, or any other suitable current indicating instrument, is connected between the two junction points 28. It will be noted that the conductors 27A and 27B are isolated or biased from the bases 31 of transistors 30 by the resistors R4. Furthermore, the operating voltage available at the terminals 26A and 26B is applied to the collector-emitter circuits of transistors 30 through resistors R6 and R5 connected to the respective conductors 27A and 27B. However, there is no current flow through the collector-emitter circuits until a signal voltage appears at the terminals 17 connected to the bridge circuit such as shown in FIG. 2. Consequently, under no load condition, indicating meter 20 will indicate zero true watts consumed by the external circuit.

Figure 4:
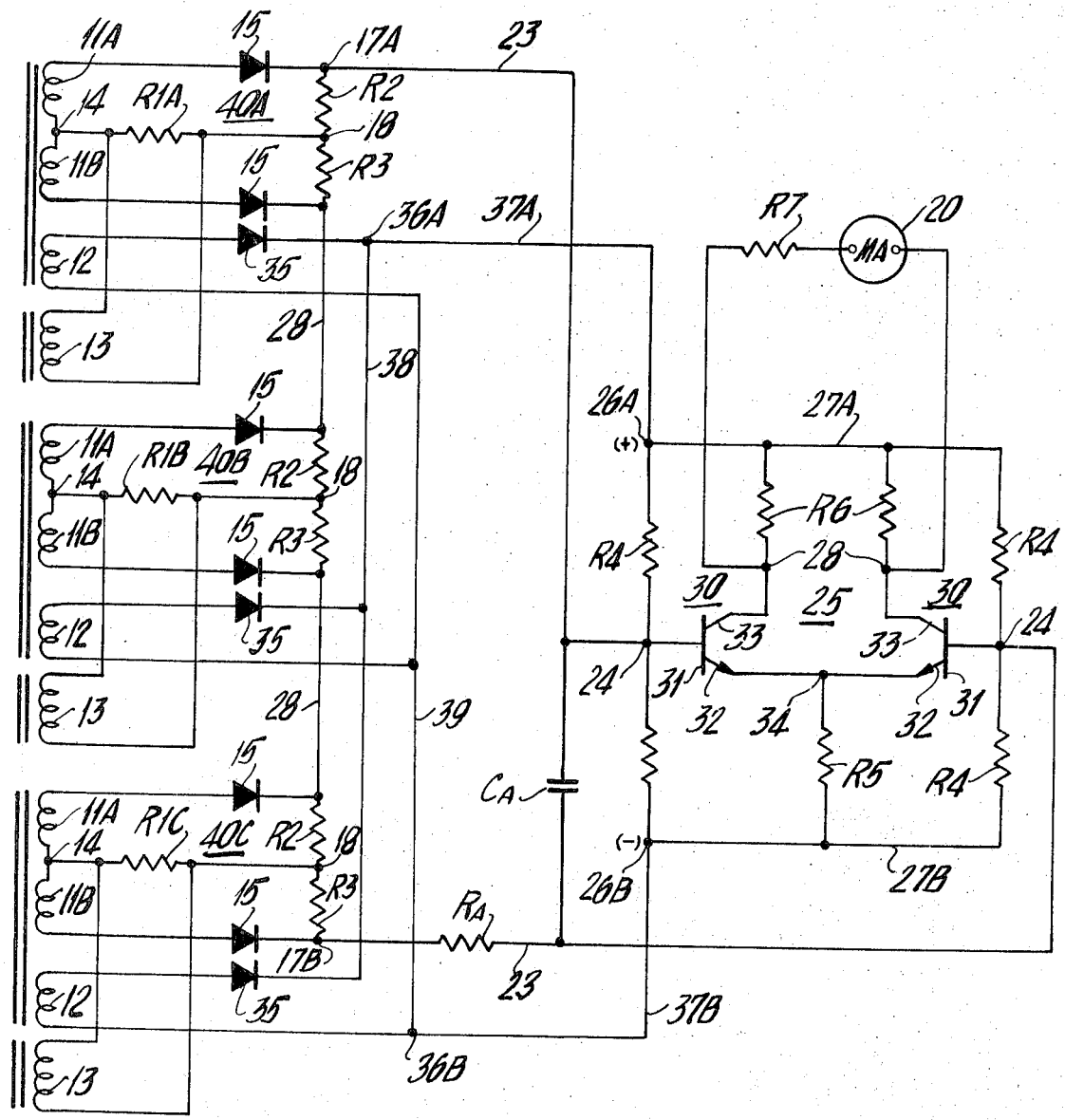
FIG. 4 is a schematic wiring diagram of the direct reading wattmeter of the present invention as used with a Y-connected, grounded neutral three-phase a.c. circuit such as shown in FIG. 1, but with the primary windings of the potential and current transformers being omitted.

The means for applying, to the terminals 26A and 26B, a d.c. voltage which is proportional to the a.c. voltage in the external circuit will be explained more fully in connection with FIG. 4 which illustrates the direct reading wattmeter of the invention as applied to a three-phase a.c. circuit, such as shown in FIG. 1. Referring to FIG. 4, three bridge circuits 40A, 40B and 40C, each identical to the bridge circuit shown in FIG. 2, are provided, with each bridge circuit being respective to a particular phase of the external a.c. supply as shown, for example, in FIG. 1. Through the medium of conductors 28, the three pairs of series-connected resistors R2, R3 are connected in series with each other between output terminals 17A and 17B, connected by respective conductors 23 to the respective junction points 24 of the differential amplifier 25. From FIG. 4, it will be noted that the second secondary windings 12 of each potential transformer are used to supply, to the differential amplifier 25, a d.c. operating voltage which is proportional to the a.c. voltage in the external circuit, and varies in accordance with variations in such a.c. voltage. For this purpose, corresponding terminals of secondary windings 12 are commonly connected, through respective diodes 35 and a conductor 38, to a terminal 36A connected by a conductor 37A to terminal 26A of amplifier 25. Similarly, the opposite terminals of second secondary windings 12 are commonly connected, through a conductor 39, to a terminal 36B connected by a conductor 37B to terminal 26B of differential amplifier 25. Accordingly, the d.c. operating voltage available between terminals 26A and 26B of amplifier 25 varies in proportion to the a.c. voltage of the external circuit, as represented by the voltage across the second secondary windings 12 of the potential transformers PT-A, PT-B and PT-C. Meter 20 is again connected to terminals 28 in series with a limiting resistance R7.

In the circuit shown in FIG. 4, the signal input to amplifier 25, at the junction points 24, represents the combined current and voltage inputs of the three phases, as determined by the three bridge circuits 40A, 40B and 40C whose pairs of seriesconnected resistors R2, R3 are connected in series with each other between the terminals 17A and 17B. By virtue of the operating voltage of amplifier 25 being provided conjointly by the second secondary windings 12 of the three potential transformers, the operating voltage of amplifier 25 varies in accordance with variations in the a.c. voltage of the external circuit. Furthermore, the differential amplifier 25 amplifies the input voltage available at the junction points 24 so that a highder reading is available for meter 20.

The advantage of the arrangement is that there is obtained a multiplication factor, which is a squaring factor in a direct relation. If the voltage applied to the external circuit decreases, the current applied will also decrease proportionately and the net result in watts is a square relation. Thus, if the voltage decreases to one half, the current will decrease to one half and the watts will decrease to one quarter, representing the square relation. An additional advantage obtained is the amplification due to use of differential amplifier 25, providing a higher operating current for meter 20.

The arrangement shown in FIG. 4 will operate with all three phases in operation, with only two phases in operation, or with only one phase in operation. When only two phases are in operation, the output is two thirds of that provided with three phases in operation and when only one phase is in operation, the output is one third of that when three phases are in operation. The direct reading wattmeter of the invention may not only be used with a Y-connected, grounded neutral arrangement shown in FIG. 1 but also with a delta-connected three-phase a.c. circuit as well as with a so-called two and one half arrangement as well as with a two phase or single phase arrangement. As such circuits and their connections to the differential amplifier will be readily apparent to those skilled in the art, they have not been shown or described.

While specific embodiments of the invention have been shown and described in detail to illustrate the principles of the invention, it will be understood that the invention may be embodied otherwise without departing from such principles.

What is claimed is:

1. A direct reading wattmeter, for indicating the true watts power consumption of an a.c. circuit, comprising, in combination, a potential transformer having a primary winding connected across a phase of an a.c. circuit and having a first center-tapped secondary winding; a current transformer in said phase; means forming a full wave rectifying bridge circuit including said first center-tapped secondary winding, a pair of series-connected bridge resistors connected between the outer terminals of said first secondary winding, diode means, and a terminal resistor of said current transformer connected between the center tap of said first secondary winding and the junction point of said series-connected bridge resistors, and constituting the diagonal of said bridge circuit; whereby the voltage drop across said series-connected resistors is a d.c. voltage proportional to the current in said a.c. circuit; a differential amplifier having an input circuit connected to the outer terminals of said series-connected bridge resistors for applying, to said input circuit, such d.c. voltage proportional to the current in said a.c. circuit, and having an output circuit; means applying a d.c. operating voltage, proportional to the voltage of said a.c. circuit, to said differential amplifier; whereby said differential amplifier multiplies the d.c. voltage of its input circuit by the d.c. operating voltage applied thereto with a multiplication factor which is a directly related squaring factor so that the voltage at its output circuit is directly proportional to the current of said a.c. circuit multiplied by the voltage of said a.c. circuit; and a current indicating meter connected to the output circuit of said differential amplifier to indicate the true watts power consumed by said a.c. circuit.

2. A direct reading wattmeter, as claimed in claim 1, in which said potential transformer has a second secondary winding; and diode means connecting the terminals of said second secondary winding to said differential amplifier to apply a d.c. operating voltage, proportional to the voltage of said a.c. circuit, to said differential amplifier.

3. A direct reading wattmeter, as claimed in claim 1, in which said a.c. circuit is a polyphase a.c. circuit; respective said potential transformers having primary windings interconnecting pairs of conductors of said polyphase a.c. circuit, and each having a respective first center-tapped secondary winding, respective current transformers for each conductor of said polyphase a.c. circuit, and each having a respective terminal resistor connected thereacross; respective said full wave rectifying bridge circuits each including the first center-tapped secondary winding of a respective potential transformer and the terminal resistor of a respective current transformer; said differential amplifier input circuit including a pair of input terminals; and means connecting all of said bridge resistors in series between said input terminals.

4. A direct reading wattmeter, as claimed in claim 3, in which each potential transformer has a second secondary winding; said differential amplifier including a pair of second d.c. input terminals; diode means commonly connecting corresponding terminals of all of said second secondary windings to one of said second d.c. input terminals; and circuit means commonly connecting the opposite terminals of all of said secondary windings to the other second d.c. input terminal.

5. A direct reading wattmeter, as claimed in claim 1, in which said differential amplifier includes a pair of like transistors each having a signal input circuit and an output circuit; said d.c. operating voltage being applied in parallel to the output circuits of both transistors; one outer terminal of said series-connected bridge resistors being connected to the input circuit of one transistor and the other outer terminal of said series-connected bridge resistors being connected to the input circuit of the other transistor.

6. A direct reading wattmeter, as claimed in claim 5, in which each transistor includes a base, an emitter, and a collector; said d.c. operating voltage being applied in parallel to the emitter-collector circuits of both transistors; each outer terminal of said series-connected bridge resistors being connected to the base of a respective transistor; said indicating meter being connected between the collectors of said two transistors.

7. A direct reading wattmeter, as claimed in claim 5, in which said transistor output circuits are connected in parallel with each other between a pair of d.c. input terminals; said potential transformer having a second secondary winding; diode means connecting one terminal of said second secondary winding to one of said d.c. input terminals; and circuit means connecting the other terminal of said secondary winding to the other d.c. input terminal.

8. A direct reading wattmeter, as claimed in claim 4, in which said differential amplifier is a transistorized differential amplifier including a pair of like transistors each having an input circuit and an output circuit; means connecting said transistor output circuits in parallel between said second d.c. input terminals; and circuit means connecting one outer terminal of said series-connected bridge resistors to the input circuit of one transistor and the other outer terminal of said series-connected bridge resistors to the input circuit of said other transistor.

9. A direct reading wattmeter, as claimed in claim 8, in which each transistor includes a base, an emitter and a collector; the output circuit of each transistor being constituted by its emitter-collector circuit, and the input circuit of each transistor including its base; said indicating meter being connected between the collectors of said transistors.

10. A direct reading wattmeter, as claimed in claim 9, in which said transistors are NPN transistors.

* * * * *